March 19, 1935.  A. LAZZARINI  1,994,581
AUTOMATIC CHANGE GEAR TRANSMISSION MECHANISM FOR AUTOMOBILES
Filed Sept. 5, 1934   3 Sheets-Sheet 1

INVENTOR:
Ald. Lazzarini

March 19, 1935.  A. LAZZARINI  1,994,581
AUTOMATIC CHANGE GEAR TRANSMISSION MECHANISM FOR AUTOMOBILES
Filed Sept. 5, 1934  3 Sheets-Sheet 2
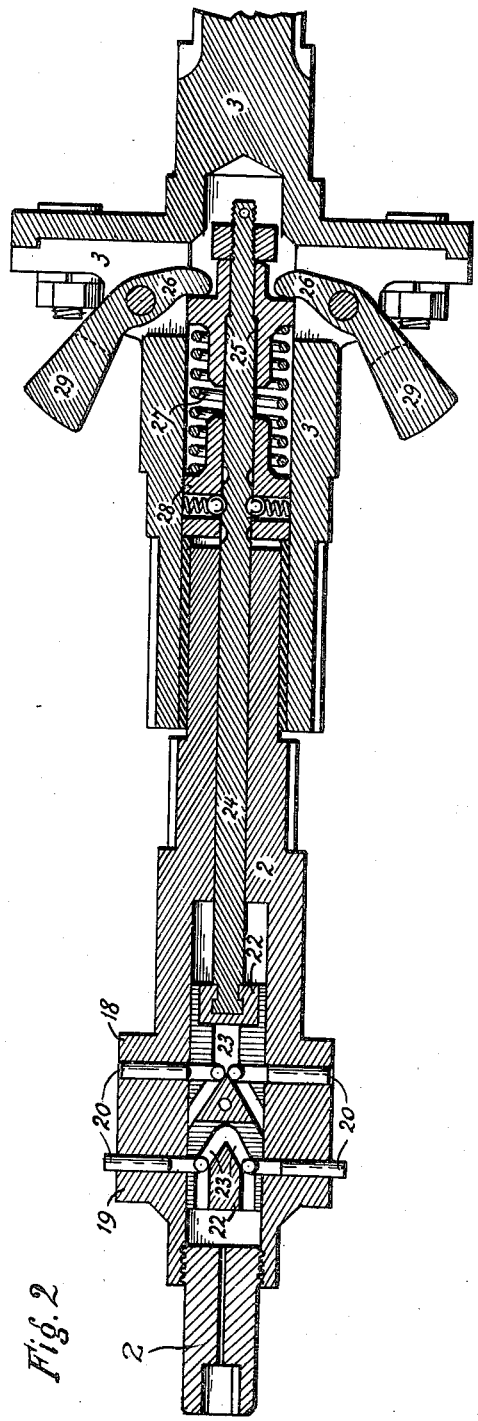
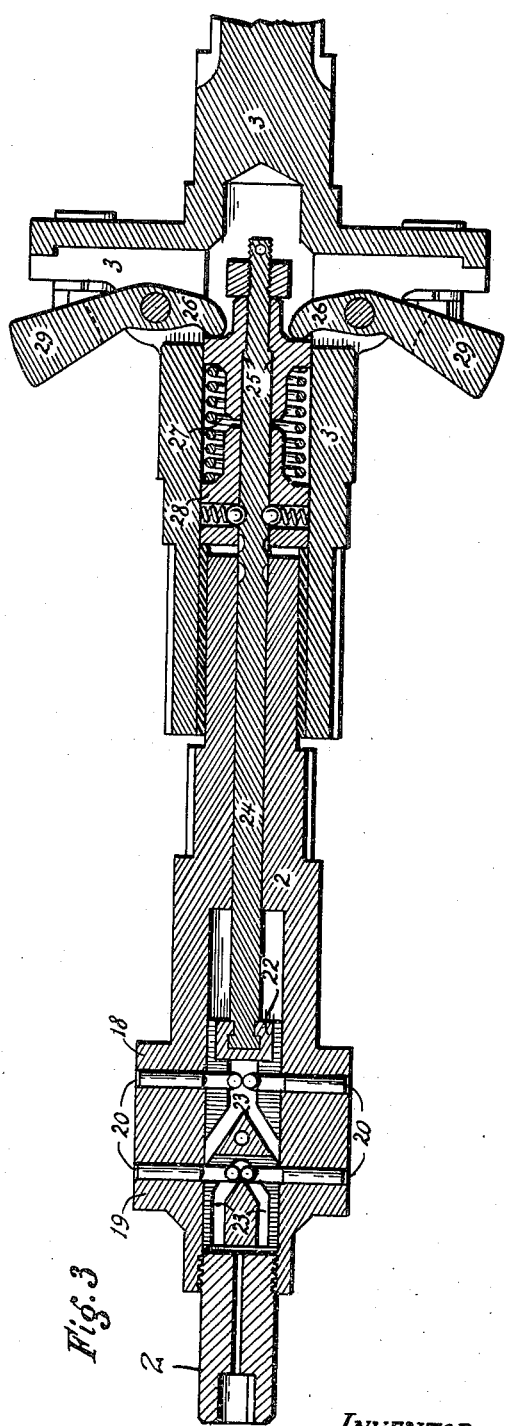
Fig.2
Fig.3
INVENTOR:
Aldo Lazzarini March 19, 1935.   A. LAZZARINI   1,994,581
AUTOMATIC CHANGE GEAR TRANSMISSION MECHANISM FOR AUTOMOBILES
Filed Sept. 5, 1934   3 Sheets-Sheet 3
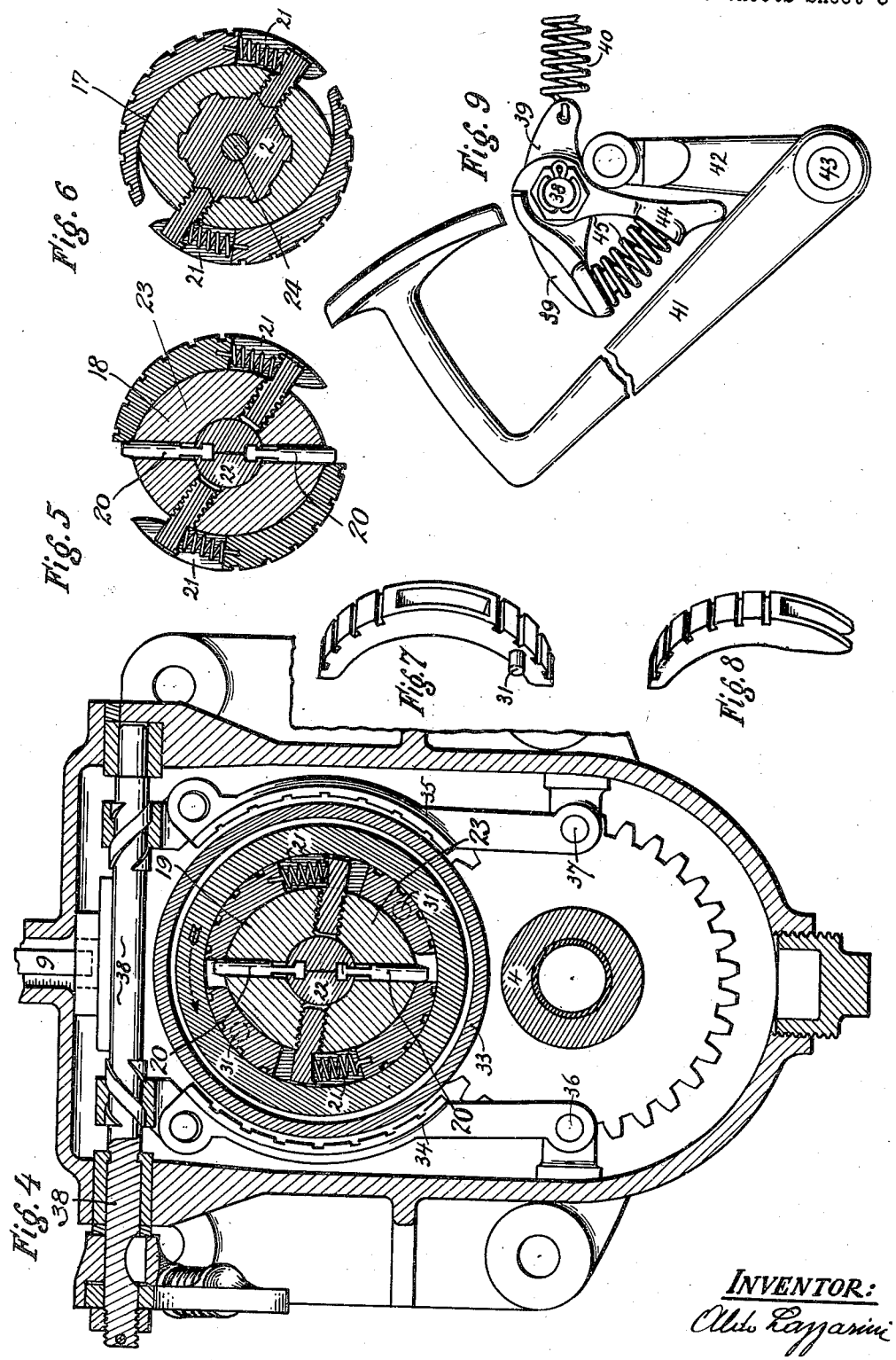
INVENTOR:
Aldo Lazzarini Patented Mar. 19, 1935

1,994,581

UNITED STATES PATENT OFFICE 1,994,581

AUTOMATIC CHANGE-GEAR TRANSMISSION MECHANISM FOR AUTOMOBILES

Aldo Lazzarini, Flushing, N. Y.

Application September 5, 1934, Serial No. 742,758

8 Claims. (Cl. 74—336.5)

The main object of this invention is to produce a change-gear transmission embodying certain features whereby no manual shifting of the gears is to be made except for the reverse speed when needed and for all forward speeds at the outset, thereupon all changes from low-speed to high-speed to be effected automatically and according to the acceleration of the vehicle speed.

A second object of this invention is to obtain a transmission which, by its automatic feature, may be made to cooperate with an automatic main clutch of the existing types, thereby simplifying the control of the forward motion of an automobile to the sole use of the accelerator lever.

A third object of this invention is to include a free-wheeling operation, which, having its elements placed ahead of the reverse gears, does not require the driver's intervention for locking it before use is made of said reverse gears or for resetting it at any time, it being always operatively set.

The fourth object of this invention is to optionally include certain auxiliary controls with which the pneumatic brake resistance of the gas engine may be brought into play at the operator's will by the locking of the free-wheel, without the necessity of his disconnecting the transmission or the main clutch.

In bringing the aforesaid objects to a practical solution, attention has been paid to the desirability of keeping the mechanism within such physical proportions as to make it adaptable of installation in currently built vehicles, its size and shape corresponding about to that of the usual manual shift-gear mechanism.

An arrangement of the parts of my invention is illustrated in the accompanying drawings, in which Fig. 1 is a vertical longitudinal section of the mechanism as set for the initial forward speed; Fig. 2 shows the controlling means operated by the governor as part of the same assembly shown in Fig. 1, said controlling means and governor being set for the intermediate speed-ratio; Fig. 3 shows the same parts as set for the high speed-ratio or direct drive; Fig. 4 is a transverse section of the mechanism through a clutch member along line 4—4 of Fig. 1; Fig. 5 is a transverse section of parts of a clutch used for the intermediate speed-ratio corresponding to line 5—5 of Fig. 1; Fig. 6 is a similar section of parts of a clutch used for the low speed-ratio corresponding to line 6—6 of Fig. 1; Fig. 7 is a perspective view of one of the shoe-pawls for the high speed-ratio clutch shown in Fig. 4; Fig. 8 is a perspective view of one of the shoe-pawls for the intermediate speed-ratio clutch shown in Fig. 5; and Fig. 9 shows the exterior connection of the free wheeling controls with the brake pedal of the vehicle's wheels.

The transmission assembly as shown, comprises three forward speeds besides the reverse. It is understood that this same invention may be developed into a mechanism composed of any number of speed-ratios provided that one or more speed-ratio units retain the original features herein described. It is also possible to put this invention to other use than the propelling of an automobile.

Reference figures are the same for like parts in all views.

In Fig. 1 a driving shaft 1 passes to the interior of the casing through a frictionless bearing and aligns with shaft 2 by means of a terminal socket and roller bearing. At the opposite end, shaft 2 fits into a socket of driven shaft 3, this axial articulation being required only for the use of the reverse speed, therefore not necessarily to be provided with a roller bearing. Shaft 3 passes through a frictionless bearing to an adjacent compartment housing a governor, thence through another similar bearing to the outer end.

The driving shaft 1, the two sections 2 and 3, of the driven shaft and the counter-shaft 4, all carry gears in an arrangement like that of a conventional gear-shift transmission, a difference being that the gears for the forward speed, instead of being shiftable, are kept in mesh at all times with the related gear of the counter-shaft. The reverse speed is obtained in the identical way of the conventional type of transmission by the usual manual shifting of gear 6 along a splined portion of driven shaft 3 into mesh with the idle gear 7, the latter being permanently meshing with pinion 8 of the counter shaft.

The shiftable gear 6 may be set in either one of three positions by operating an exterior lever 9, namely the reverse speed position as described above, a disengaged or neutral position, and a position for all forward speeds as shown in Fig. 1. It will be noticed that in this position gear 6 causes itself and the two sections 2 and 3 of the driven shaft to be locked together by the engagement of a toothed clutch 10.

Driven shaft 2 loosely carries gears 11, 12 and 13, the latter being integrally connected to driving shaft 1 and functioning as a reduction drive pinion.

Counter shaft 4 is made of one piece with its gears which are 14, 15, 16 besides pinion 8, whose function for the reverse speed has been already explained.

Gear 11 is provided with a concentrical cavity 5 of cylindrical shape which forms the drum housing a one-way clutch.

Also gears 12 and 13 have a similar drum, but due to their smaller diameter instead of it being recessed into the body of the gear, it is provided alongside of it, within an enlarged extension of the same.

Shaft 2 is provided with hubs 17, 18 and 19 which are the cams operating the shoe-pawls of the clutches serving the three speed-ratios. Hub 17 for convenience of assembly is set upon shaft 2 by means of a splined mounting.

The accompanying drawings show in detail a type of one-way clutch which is made the subject of application for Patent No. 744,122, dated September 15, 1934. Any clutch of known type, however, which is operated by the torque applied to one of its elements in a given direction and which can be caused to prevent its engagement through the means hereinafter described, may serve the same purpose. Therefore, the use of a different outline of the cam or of a different type or number of the gripping elements, would not change the fundamental principles of this invention.

The peculiar operation of the one-way clutch is that when the speed of the central element (the cam) exceeds that of the outer element (the drum) in the direction in which the drum would otherwise impart the torque, the clutch as a whole will be thrown out of engagement. By the same peculiarity, when my transmission is running at a high speed-ratio, the clutches serving the lower-speed ratios will become automatically disengaged. A low speed-ratio unit would never, therefore, deliver the torque if the higher ratio units were not provided with means to prevent their engagement and to allow it only under predetermined conditions. The low speed-ratio clutch has no such checking means. The other two clutches have it in the form of as many latch-bars as there are shoe-pawls to the clutch, which bars may be made to protrude from the cam so as to impede the shoe-pawls from surmounting the bulges of said cam and engage upon the drum. In Figs. 4 and 5 the latch-bars 20 are jutting out. In Fig. 4 the arrow indicates the direction of rotation of the drum of the clutch. The moment the bars are caused to withdraw and clear the cam surface, the shoe-pawls will be free to slide over the cam bulges as impelled by springs 21 up against the inner cylindrical surface of the drum, thus causing the drum's rotational friction upon the pawls to lock all elements of the clutch.

The bars movements are controlled by a plunger-cam 22 located into a cylindrical cavity of shaft 2.

The horizontal movements of the plunger-cam are transformed in radial movements of the latch-bars by guiding the T-shaped heads of the bars into the composite horizontal and oblique T-shaped slots 23 cut in the plunger-cam.

By a close examination of the corresponding parts in Figs. 1, 2 and 3, and comparing the positions of the bars, it will be seen that their movements within each individual clutch are concurrent, while their movements by sets are consecutive. The plunger-cam is connected by a collar link to a rod 24 at the opposite end of which is attached an enlarged head 25 slidably fitting a cylindrical cavity within driven shaft 3. A resilient spring 27 located in said cavity exerts a tension against the undercollar of head 25 and abuts its other end against a stationary ring 28. Radial sockets are provided in said ring to retain spring and ball catches designed to snap successively in three notches cut in rod 24 and corresponding to the positions of the three different speed-ratios.

A governor 29 is mounted on a flanged portion of driven shaft 3. The fulcrum of the governor's rocker-arms are pivoted within suitable slots cut into the flange and into the shaft in such a way as to allow the weights to swing outwardly with the rotation of the shaft while the opposite levers 26 of the rocker-arms reach with their tips to head 25. These tips pressing against the head and at the same time opposing the tension of spring 27, cause the displacement of the plunger-cam and the operation of the radial latch-bars.

Figure 2 shows the position of the controlling parts as set for the intermediate speed-ratio. Notice that the bars related to the intermediate speed-ratio are withdrawn within the hub of the clutch, clearing the cam's profile, while the bars related to the high speed-ratio are still protruding.

Figure 1:
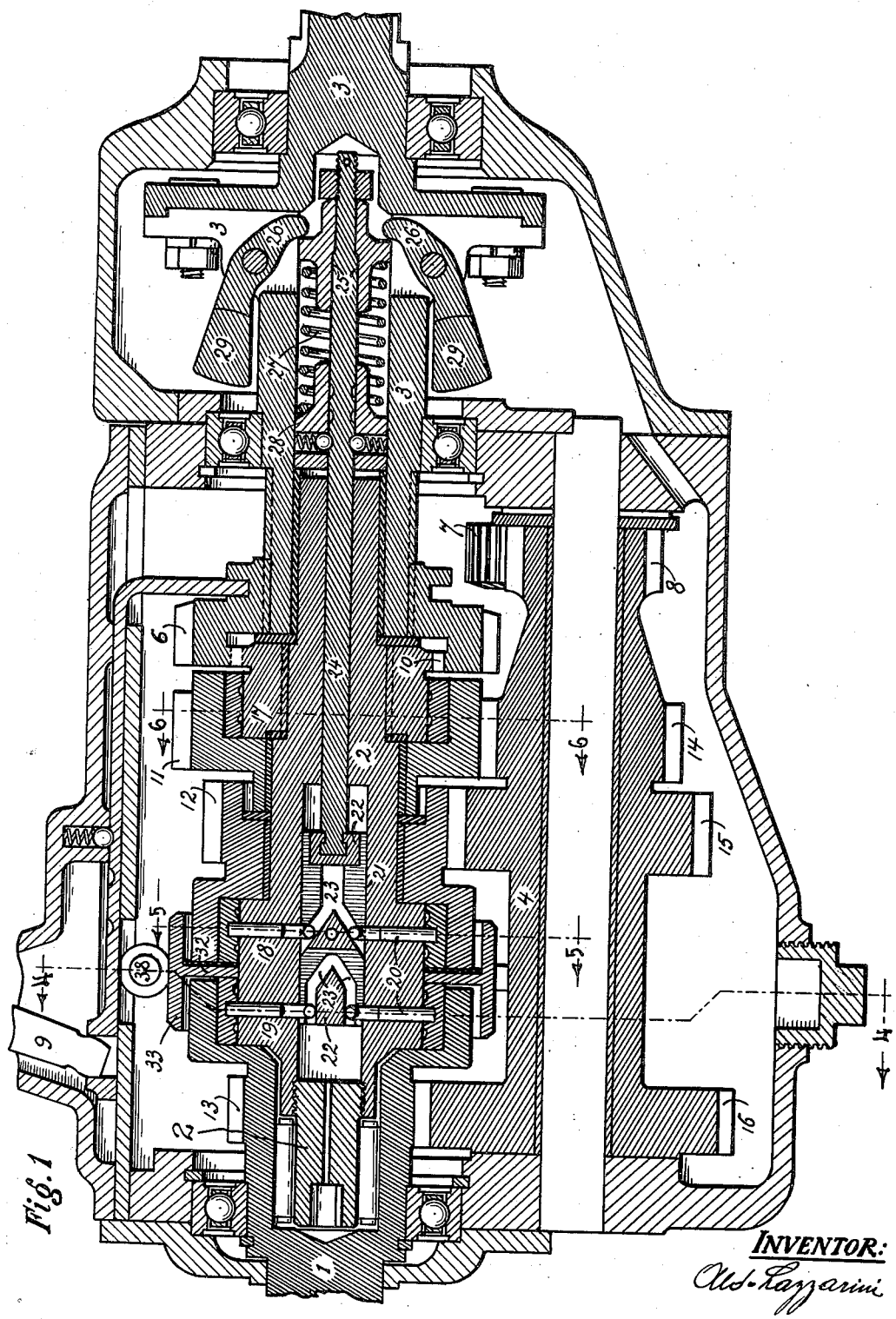
Figure 1 shows the position of the controlling parts as set for the low speed-ratio. Notice the bars retaining the pawls to the negative position in both clutches serving the intermediate and high speed-ratios.

Figure 3 shows the position of the controlling parts as set for the high speed-ratio. Notice that all bars are withdrawn and all clutches free to operate. In such condition the torque is delivered by the clutch for the high speed-ratio or direct drive.

Due to the overrunning freedom of the center cam-pieces of all the clutches as described, the driven shaft is likewise always free to turn faster than the driving elements. This is what in practice is called the free-wheel, which, insofar as described to this point, is permanently set for operation whenever the vehicle is induced to coast.

It is of considerable importance, however, that the pneumatic braking power of the gas engine be made available to the will of the operator. To that end, certain controls may be added to the assembly of this mechanism that will lock the free-wheeling elements if so desired.

Such controls, soon to be described, shall cooperate with the shoe-pawls which are part of the clutch serving the high speed-ratio or direct drive. Said shoe-pawls have in this instance a modified shape. Obviously such modification is not needed in those applications of this invention where the hold-back action of the gas engine when overrun by the vehicle's speed is not regarded as a useful feature. Then, a permanent free-wheel as developed by the clutches heretofore described (one-way clutches), may be adopted. But if said pneumatic braking action of the gas engine is wanted to be made available at the option of the operator, then said modification of the pawls of the direct drive clutch is essential.

Attention is invited to the symmetrical shape of said modified shoe-pawls (see Figs. 4 and 7). Their profile is somewhat like the outline of a crescent moon, and as they are interposed between the drum and the central cam-piece (see Fig. 4), they will about complement the elliptical shape of the latter to the cylindrical cavity of the drum, thus forming two opposite wedges for each shoe-pawl.

As said shoe-pawls are displaceable both ways upon the surface of the cam, they are capable of locking the clutch either through the application of torque upon the drum, the resistance being offered by the center cam-piece, or through the application of torque upon the center cam-piece, the resistance being offered by the drum.

Given the direction of rotation as shown by the arrow in Fig. 4, the clutch, due to the displacement of the shoe-pawls as caused by resilient springs 21, will normally lock only if the torque is applied upon the drum, provided that no checking latch-bars are in the way of the pawls. This locked condition is effected during the direct drive of the vehicle as propelled by the mechanical power of the motive plant.

But if springs 21 are being depressed by manually controlled connections, at the same time that the propulsive mechanical power is curtailed, and the vehicle's speed, due to the momentum previously built up, or due to its gravity upon a decliving road, tends to run ahead of the corresponding speed of the engine, the clutch will again lock, this time through the opposite end of the shoe-pawls.

The pneumatic braking resistance of the gas-engine is therefore called into play whenever the shoe-pawls of said clutch are caused to engage counterwise to the direction of the clutch rotation, provided the vehicle's speed tends at the same time to override the engine's speed.

Following is a description of the above mentioned controls effecting the reverse engagement of the shoe-pawls. Figs. 1, 4, 7, and 9 illustrate said controls.

A stud-pin 38 projects from one side of each shoe-pawl and each pin loosely fits into properly spaced holes of a disk member 32 rotatably mounted upon shaft 2 alongside of the clutch.

Said disk terminates with a cylindrical rim 33 upon which a frictional retardation may be applied by pressing a pair of jaws 34 and 35, as shown in Fig. 4, or by any known braking device.

The braking jaws 34 and 35 are hinged on supports 36 and 37 and their operation is dependent upon the angular motion of two opposite helical threads cut on the transversal shaft 38. The direction of said motion will determine whether the jaws will close upon, or open from rim 33. The jaws are normally kept open by the action upon shaft 38, of rocker-arm 39 and spring 40 (see Fig. 9). Notice that the end of shaft 38 to which the rocker-arm is attached is conveniently passed to the exterior of the casing.

One of many ways to command the controlling means just described is to connect them to the pedal-lever of the wheel brakes. It is essential that their operation be effected within an angle of slack play of the pedal-lever, before the wheel brakes begin to apply friction.

Figure 9 shows both pedal-lever 41 and lever 42 rigidly connected together upon fulcrum 43. A roller is yoked at the extremity of lever 42. Shaft 38 besides carrying the rocker-arm 39, loosely supports the cam-lever 44, its angular play being limited by appropriate butting stops. Upon this cam-lever is to eventually operate the roller of lever 42. A resilient spring 45 is interposed between the opposite face of said cam-lever and one side of rocker-arm 39 in order to cause the braking jaws 34 and 35 to never apply more than a yielding friction upon rim 33.

A vehicle equipped with this invention is started in the usual manner having the shift-lever in neutral position. Then the main clutch is disengaged and the shift lever set for the forward speed. As the main clutch is gradually engaged by lifting the usual pedal, the car is set in motion by the low speed-ratio gear 11 as the clutch within it will engage due to the impulse of the driving torque. The speed-ratio will subsequently change to the intermediate and to the high through the working of the automatic controlling means effecting the operation of the clutches as a result of the increasing centrifugal spread of the governor's weight during acceleration of the vehicle speed.

While slowing the vehicle speed, the centrifugal force upon the governor will diminish, and the weights will gradually fold upon the shaft due to the tension of spring 27. The controlling means will thus revert their movements and likewise the sequence of operation of the speed-ratios will change from high to low.

The jutting out of the latch-bars takes place, evidently, when the vehicle is running by its own momentum.

As the central cam-pieces are revolving at this time faster than the drums, the shoe-pawls tend to recede and clear the way to the bars as the latter are being pushed out. The importance of this condition is readily appreciated when pointed out that the latch-bars are thus never subject to withstand any side thrust above that given by the tension of springs 21.

Having completed my description, I claim as my invention:

1. A change-gear transmission comprising a driving shaft, a reduction-drive pinion attached thereto, a counter shaft carrying a plurality of rigidly connected gears driven by said pinion, a hollow shaft aligned with the driving shaft, a number of gears singly rotating upon said hollow shaft and meshing with the gears of the counter shaft, a one-way clutch adapted to provide the direct drive between the two aligned shafts and a one-way clutch for each gear upon the hollow shaft, a set of radial latch-bars within each clutch except the one related to the lowest speed gear, said latch-bars being adapted to time the engagement of the clutches associated therewith, a plunger-cam within the hollow-shaft to consecutively operate the sets of latch-bars, and a centrifugal governor rotated by a driven extension of the hollow shaft to operate the plunger cam.

2. In a change-gear transmission, the combination of a multiple forward-speed gearing in constant mesh, a shiftable gear for a reverse speed, a one-way clutch adapted to provide the direct drive, and a one-way clutch for each of the speed-reducing gears, a set of checking latch-bars within each clutch except the one related to the lowest speed gear, a sliding cam to consecutively operate the sets of latch-bars, and a governor to operate the sliding cam, the rotation of said governor being responsive to the speed delivered by the transmission.

3. A change-gear transmission consisting of two sets of gears constantly meshing in couples, one gear of each couple to rotate singly on one shaft, the others to turn rigidly together upon a parallel shaft, a lockable one-way clutch adapted to provide the direct drive, a one-way clutch for each of the singly rotating gears, a shaft aligned with and driven by the first shaft, a centrifugal governor rotated therewith and adapted to operate a slidable cam leading to a set of checking bars within each one-way clutch except the one related to the lowest speed gear in order to effect the successive operation of said clutches, a disk connected to the gripping elements of the aforesaid lockable one-way clutch, a braking arrangement upon said disk and connections to operate said braking arrangement at will.

4. A change-gear transmission comprising a driving shaft, a reduction-drive pinion attached thereto, a counter-shaft carrying a plurality of rigidly connected gears driven by said pinion, a hollow shaft aligned with the driving shaft, a number of gears singly rotating upon said hollow shaft and meshing with the gears of the counter-shaft, a lockable one-way clutch adapted to provide the direct drive between the two aligned shafts and a one-way clutch for each gear on the hollow shaft, a set of radial latch-bars within each clutch except the one related to the lowest speed gear, said latch-bars being adapted to time the engagement of the clutches associated therewith, a plunger cam within the hollow-shaft to consecutively operate the sets of latch-bars, and a centrifugal governor rotated by a driven extension of the hollow shaft to operate the plunger-cam, a disk connected to the gripping elements of the aforesaid lockable one-way clutch, a braking arrangement to work upon the rim of said disk, and connections to operate said braking arrangement at will.

5. In a change-gear transmission, the combination of a multiple forward-speed gearing in constant mesh, a shiftable gear for a reverse speed, a lockable one-way clutch adapted to provide the direct drive, and a one-way clutch for each of the speed-reducing gears, a set of checking latch-bars within each clutch except the one related to the lowest speed gear, a sliding cam to consecutively operate the sets of latch-bars, and a governor to operate the sliding cam, the rotation of said governor being responsive to the speed delivered by the transmission; a disk connected to the gripping elements of the aforesaid lockable one-way clutch, a braking arrangement adapted to retard the rotation of said disk and connections to operate said braking arrangement at will thus effecting the engagement of the said gripping elements of the lockable one-way clutch to eliminate free-wheeling.

6. A change-gear transmission consisting of two sets of gears constantly meshing in couples, one gear of each couple to rotate singly on one shaft, the others to turn rigidly together upon a parallel shaft, a manually lockable one-way clutch adapted to provide a direct drive, a one-way clutch for each of the singly rotating gears, a shaft aligned with and driven by the first shaft, a centrifugal governor rotated therewith and adapted to operate a slidable cam leading to a set of checking bars within each one-way clutch except the one related to the lowest speed gear in order to effect the successive operation of said clutches.

7. A change-gear transmission comprising a driving shaft, a reduction-drive pinion attached thereto, a counter shaft carrying a plurality of rigidly connected gears driven by said pinion, a hollow shaft aligned with the driving shaft, a number of gears singly rotating upon said hollow shaft and meshing with the gears of the counter shaft, a one-way clutch adapted to provide the direct drive between the two aligned shafts and a one-way clutch for each gear upon the hollow shaft, a centrifugal governor adapted to operate an axially sliding member within the cavity of the aforesaid hollow shaft, and checking elements within the one-way clutches, except the one related to the lowest speed gear, said checking elements being operated by the axially sliding member to effect the consecutive engagement and disengagement of the one-way clutches.

8. A change-gear transmission comprising a driving shaft, a pinion attached thereto, a counter shaft carrying a plurality of rigidly connected gears driven by said pinion, a shaft aligned with the driving shaft carrying a number of gears singly rotating and driven by the gears of the counter shaft, a one-way clutch adapted to provide the direct drive between the two aligned shafts, a one-way clutch for each singly rotating gear, checking elements within each one-way clutch, except the one related to the lowest speed gear, a centrifugal governor rotated in response to the speed delivered by the transmission and a slidable connection between said governor and said checking elements for effecting a consecutive operation of the one-way clutches.

ALDO LAZZARINI.